H. T. KRAKAU.
BOLSTER.
APPLICATION FILED JUNE 24, 1909.
972,768.
Patented Oct. 11, 1910.
3 SHEETS—SHEET 1.
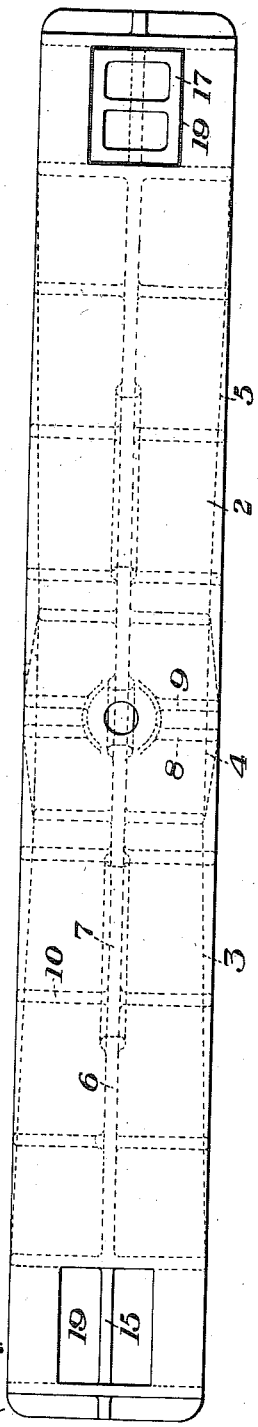
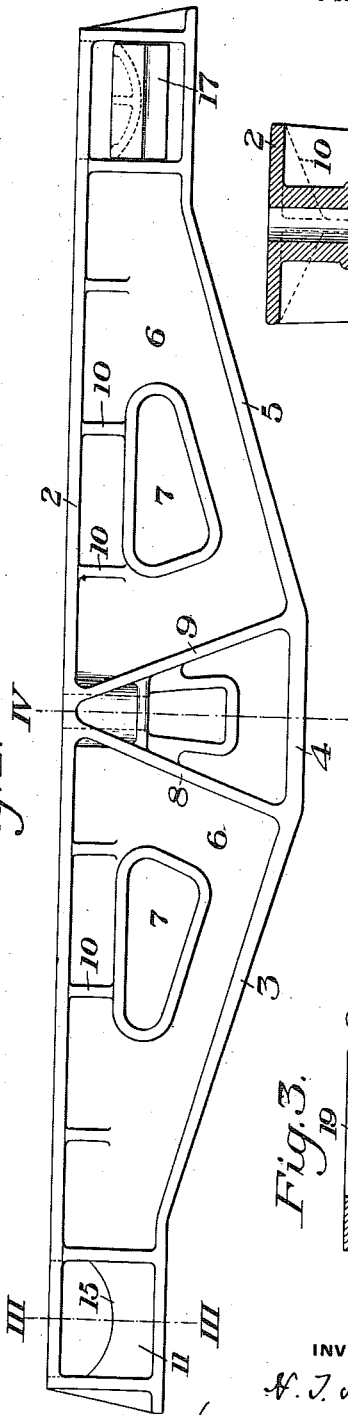
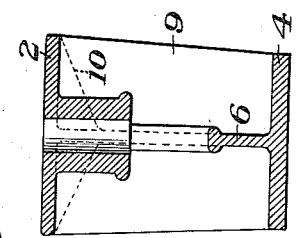
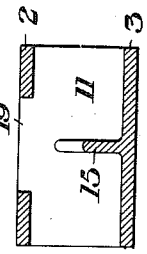
WITNESSES
INVENTOR

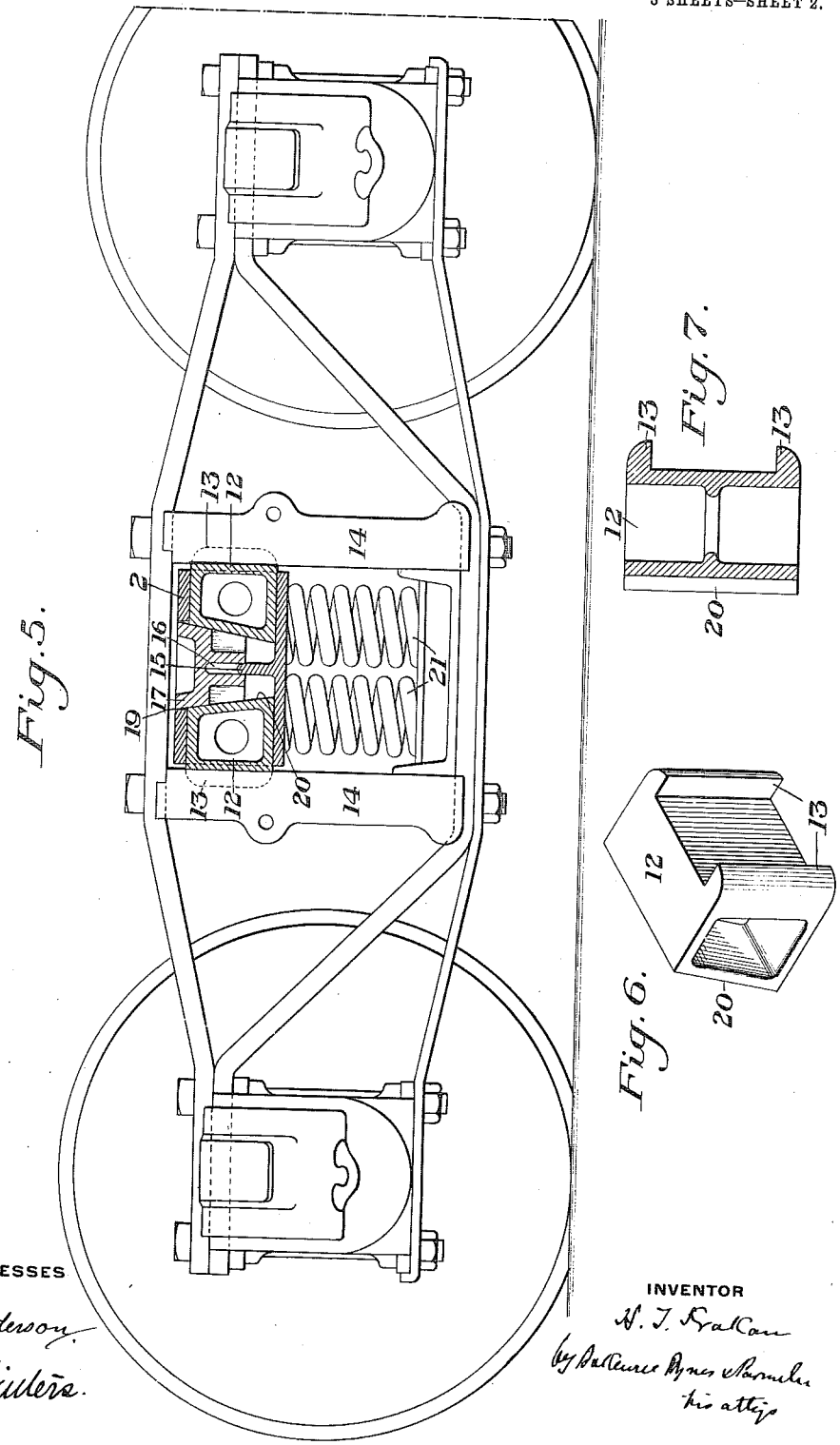

H. T. KRAKAU.
BOLSTER.
APPLICATION FILED JUNE 24, 1909.
972,768.
Patented Oct. 11, 1910.
3 SHEETS—SHEET 3.
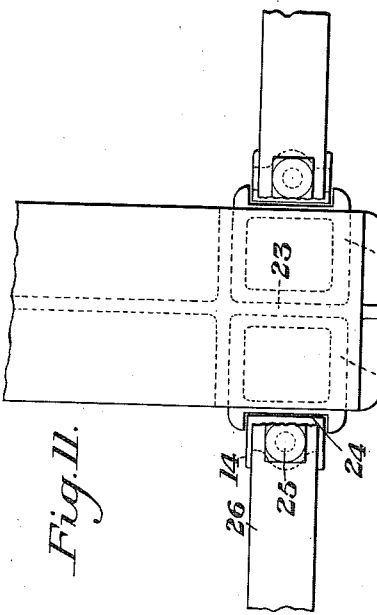
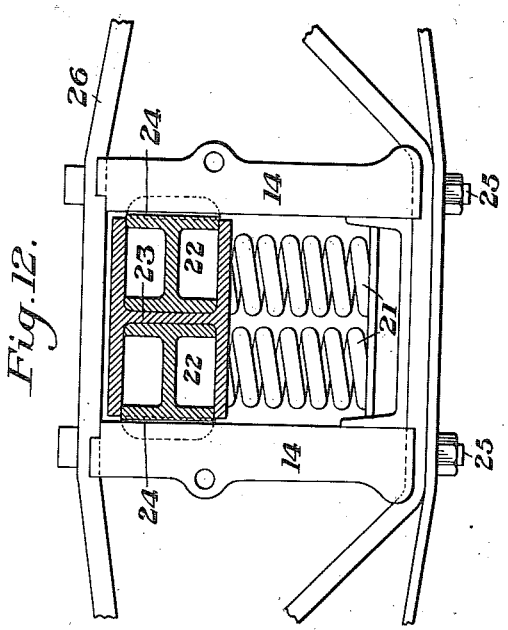
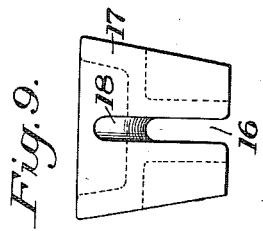
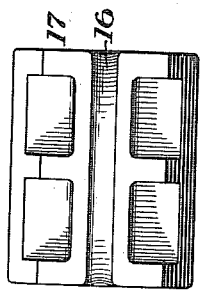
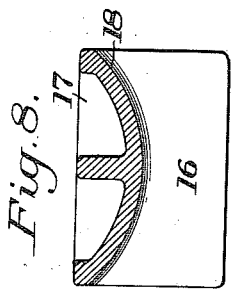
WITNESSES
INVENTOR

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

BOLSTER.

972,768.

Specification of Letters Patent.  Patented Oct. 11, 1910.

Application filed June 24, 1909. Serial No. 504,051.

*To all whom it may concern:*

Be it known that I, HARRY T. KRAKAU, of Cleveland, in the county of Cuyahoga and State of Ohio, have invented a new and useful Improvement in Bolsters, of which the following is a full, clear, and exact description, reference being had to the accompanying drawings, forming part of this specification, in which—

Figure 1 is a top plan view of a bolster embodying my invention; Fig. 2 is a side view of the same; Figs. 3 and 4 are sections taken respectively on the lines III—III and IV—IV; Fig. 5 is a side view showing the bolster applied to a car truck, the bolster being in cross section; Figs. 6 and 7 are detail views of one of the column guides; Figs. 8, 9 and 10 are detail views of the wedge; Fig. 11 is a top view, and Fig. 12, a sectional view, showing a modified arrangement of the column guides.

My invention has relation to car bolsters, and is designed to provide a bolster in which the metal is so disposed as to take the strains and transmit them to the points of support in the most efficient manner, whereby there is provided a bolster of maximum strength, with a minimum amount of metal contained therein.

A further object of the invention is to provide an improved construction and arrangement of the column guides for the bolster; and further, to provide means for automatically adjusting the slack or looseness between the columns.

The nature of my invention will be best understood by reference to the accompanying drawings, which will now be described, it being premised, however, that various changes may be made in the details of the construction and arrangement of the various parts by those skilled in the art, without departing from the spirit and scope of the invention as defined in the appended claims.

The bolster as shown in Figs. 1 and 2, consists of an integral casting composed of the upper or main compression member 2, the lower, or tension member 3, 4 and 5, the connecting web 6, which is preferably lightened in weight by having portions thereof near the neutral axis, cored out or removed as shown at 7; and the compression members 8 and 9 arranged in A-form. The main compression member 2, and the tension member 3, 4 and 5, are preferably of broad form, the web 6 being centrally arranged, and suitable reinforcing ribs 10 being provided. The compression strains when received by the member 2 under load, are delivered to the compression members 8 and 9, and thence to the tension member 3, 4 and 5. The central portion 4 of the tension member takes the maximum strain in direct tension between the members 8 and 9; and this strain is then carried to the points of support by the oblique portions 3 and 5 of the tension member. This tension member is preferably of greatest depth at the central portion of the truss, thence tapering in both directions up to the points of support. The tension member carries the strains in a straight line, there being no bending moment or torsional strain on said member at any time. Said member is also supported throughout its full width by the compression members 8 and 9.

In the form of the invention shown in Figs. 1 to 10, inclusive, the end portions of the bolster are formed with the laterally open seats or pockets 11 to receive the column guides 12, one of which is shown in detail in Figs. 6 and 7. These guides, instead of being formed integral with, or rigidly secured to the bolster, consist of separate pieces which are seated in the pockets 11, and which are provided on their outer sides with the lips or flanges 13 to fit the column 14 of the side frame of the car truck. These column guides are preferably made hollow in order to reduce their weight. Centrally of each pair of the pockets 11 in which these guides are seated, the end portions of the bolster are provided with the ribs 15. These ribs are concaved on their upper edges to engage a centrally arranged slot 16 in a wedge member 17, the upper wall of said slot being convexed, as shown at 18 in Figs. 8 and 9, to correspond to the concavity of the ribs 15. One of these wedges is employed at each end of the bolster, being inserted through an opening 19 in the main compression member 2, its slot fitting over the rib 15, and its tapering sides engaging the tapered inner sides 20 of the column guides. As shown in Fig. 5, the function of this wedge is to move down by gravity, so as to keep the column guides held out against the columns 14 so that there will be no spaces or play between the guides and the columns. This wedge also acts to take up all inequalities in the castings, and also takes up all wear, due to motion between the columns and the column guides, thereby maintaining a solid bridge between the columns 14 at all times. When a strain comes on the bolster longitudinally of the truck, the effect is simply a push on the columns, instead of a hammer blow whenever cars are moved so that the bolster gets a certain jerk. In assembling the truck, the column guides are put in the bolster, and slipped back, so that the lips or flanges 12 are flush with the sides of the bolster; the bolster is then slipped in between the columns until the central position is reached. The column guides are then moved out so as to come to the proper positions on the columns; the wedge members are then dropped in, the bolster is lifted up to its proper position, and the bolster springs 21 are inserted. The same method in reverse order is employed in removing the bolster from the truck. It will be obvious that this feature of my invention is applicable to side frames of either the built up arch bar type, or of the cast form.

In the modification shown in Figs. 11 and 12, the automatic adjustment feature is omitted, and column guides, such as shown at 22 in Figs. 11 and 12 are inserted in laterally open pockets in the end portions of the bolster, said pockets being separated by the central web 23. The compression member of the bolster is not cut out, as shown at 15, in Fig. 1, but the only opening is at the sides of the pockets where the column guides are inserted. A slight clearance is provided between the column guides and the columns, as indicated at 24, in Fig. 12, and in this form of the invention, to take the bolster out, it is necessary to first remove the column bolts 25 and to take off the top arch bar 26.

The advantages of my invention will be apparent to those skilled in the art. The cast bolster shown and described, provides a bolster of great strength with a minimum amount of metal, owing to the arrangement and disposition of the metal therein, whereby the various strains are taken care of in the most efficient manner. The provision of the separate column guides is also a feature of great advantage, since these guides may be formed separately from the bolster and readily removed and renewed when necessary. When the automatic adjustment feature is employed the further advantages of facility in inserting and removing the bolsters from the truck; and the taking up looseness and wear between the guides and the columns, thereby maintaining a solid bridge between the columns at all times, are obtained.

It will be obvious that many changes can be made within the scope of my invention, thus, the column guides may be of various forms, as may also the adjusting wedge; these guides may be used with other forms of bolsters; and the invention may be employed in connection with various forms of side frames besides that shown.

I claim:

1. A bolster, comprising a main compression member, a tension member, a web connecting said members, and supplemental compression members connecting the main compression member with the tension member, said compression members being arranged in downwardly diverging or A-form; substantially as described.

2. A bolster, comprising a main compression member, a tension member, a web connecting said members, and supplemental compression members connecting the main compression member with the tension member, said compression members being arranged in downwardly diverging or A-form, and said supplemental compression members extending substantially the full width of the main compression member and of the tension member and a tension member having a straight horizontal portion between the said supplemental compression members; substantially as described.

3. A bolster, comprising a main compression member, a tension member, consisting of oblique tapered end portions and a substantially straight central portion, a central web connecting the main compression member with the tension member, and central supplemental compression members connecting the main compression member and the tension member throughout substantially their entire width; substantially as described.

4. An integral cast bolster, having its main compression member and its tension member connected by a web, and also by central divergent supplemental compression members; substantially as described.

5. A bolster provided at its end portions with laterally open seats or pockets, and column guides slidably seated therein; substantially as described.

6. A bolster having its end portions provided with laterally open seats or pockets, column guides seated therein, and means for moving the column guides outwardly in said seats or pockets into contact with the bolster guides or columns of the car truck frame; substantially as described.

7. A car bolster having a laterally open pocket at its end portion, and a column guide slidably seated in said pocket and insertible and removable at the side thereof; substantially as described.

8. A bolster having laterally open seats or pockets at its end portions, column guides movably seated therein, and a gravity member between adjacent guides; substantially as described.

9. A bolster having its end portions provided with laterally open seats or pockets, column guides movably seated therein, and a gravity wedge between and engaging adjacent guides; substantially as described.

10. A bolster having its end portions provided with laterally open seats or pockets, column guides movably seated therein, and a gravity wedge between and engaging adjacent guides, the bolster having a top opening to receive said wedge; substantially as described.

11. A bolster having its end portions provided with laterally open seats or pockets, column guides movably seated therein, and a gravity wedge between and engaging adjacent guides, said guides having wedge-shaped inner surfaces for engagement with said wedge; substantially as described.

12. A bolster having its end portions provided with laterally open seats or pockets, column guides movably seated therein, and a gravity wedge between and engaging adjacent guides, the bolster and wedge having interfitting guiding portions; substantially as described.

13. A bolster having its end portion provided with laterally open seats or pockets, column guides movably seated therein, and a gravity wedge between and engaging adjacent guides, the bolster having a rib, and the wedge having a slot for engagement with such rib; substantially as described.

14. In a car truck, a side frame having openings therethrough for the ends of a bolster and provided with columns, and a bolster having its end portions extending through said openings, said bolster having laterally open seats or pockets, and column guides slidably seated in said seats or pockets and arranged to slidably engage the columns of the side frame; substantially as described.

15. A cast bolster comprising a main compression member, a tension member, an integral web connecting said members, and supplemental compression members connecting the main compression member with the tension member, said compression members being arranged in downwardly diverging or A-form, the tension member having a straight portion between the supplemental compression members and extending from said straight portion obliquely upwardly in a straight line to about the points of support of the bolster; substantially as described.

In testimony whereof, I have hereunto set my hand.

HARRY T. KRAKAU.

Witnesses:
 HARRY E. ORR,
 CLARENCE GUENTHER.